(12) United States Patent
Raittinen et al.

(10) Patent No.: US 10,050,547 B2
(45) Date of Patent: Aug. 14, 2018

(54) QUIESCENT POWER SUPPLY

(71) Applicant: INTEL CORPORATION, Santa Clara, CA (US)

(72) Inventors: Jaakko Raittinen, Tampere (FI); Arto Siili, Tampere (FI); Jaakko Isohella, Tampere (FI)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/086,004

(22) Filed: Mar. 30, 2016

(65) Prior Publication Data

US 2017/0288566 A1 Oct. 5, 2017

(51) Int. Cl.
*H02M 7/04* (2006.01)
*H02M 1/08* (2006.01)
*H02M 1/00* (2006.01)

(52) U.S. Cl.
CPC ............... *H02M 7/04* (2013.01); *H02M 1/08* (2013.01); *H02M 2001/0009* (2013.01); *H02M 2001/0032* (2013.01)

(58) Field of Classification Search
CPC ... H02M 7/04; H02M 1/08; H02M 2001/0032
USPC ....................................................... 363/125
See application file for complete search history.

(56) References Cited

U.S. PATENT DOCUMENTS

| | | | | |
|---|---|---|---|---|
| 4,277,692 A | * | 7/1981 | Small | H02J 9/062 307/66 |
| 5,812,386 A | * | 9/1998 | Youn | H02M 3/28 327/544 |
| 2003/0128562 A1 | * | 7/2003 | Chang | H02J 9/02 363/89 |
| 2008/0290731 A1 | | 11/2008 | Cassidy | |
| 2009/0027932 A1 | | 1/2009 | Haines et al. | |
| 2010/0202161 A1 | | 8/2010 | Sims et al. | |
| 2011/0128153 A1 | | 6/2011 | Sims et al. | |
| 2011/0291611 A1 | * | 12/2011 | Manor | H02J 7/0055 320/107 |
| 2012/0235630 A1 | * | 9/2012 | Qiu | H02J 7/022 320/107 |
| 2013/0207455 A1 | * | 8/2013 | Doljack | H02J 7/0036 307/9.1 |
| 2013/0336010 A1 | * | 12/2013 | Saxena | H02M 1/12 363/13 |
| 2014/0369084 A1 | | 12/2014 | Freeman et al. | |
| 2015/0054413 A1 | * | 2/2015 | Chen | H05B 37/0281 315/155 |

OTHER PUBLICATIONS

International Search Report received for PCT Patent Application No. PCT/US2017/023472, dated Mar. 30, 2017, 4 pages.

* cited by examiner

*Primary Examiner* — Adolf Berhane
*Assistant Examiner* — Bart Iliya

(57) ABSTRACT

A quiescent power supply including an AC/DC converter, a switch, an energy storage device, and a controller is disclosed. The switch is electrically coupled to the AC/DC converter to electrically disconnect the AC/DC converter from an AC supply line. The controller is operably coupled to the switch to actuate the switch. In particular, the controller can actuate the switch to disconnect the switch during when the AC/DC converter is idle.

25 Claims, 11 Drawing Sheets

US 10,050,547 B2

QUIESCENT POWER SUPPLY

TECHNICAL FIELD

Examples described herein are generally related to power supplies and power controllers.

BACKGROUND

In general, all electrical devices draw an amount of current when plugged into an AC outlet. This is true even when the electrical device is not being used. For example, when a television is turned off it continues to consume power due to the electronics within the televisions power supply. This is often referred to as the "trigger current" or the current consumed by the transformer and/or electronics within the power supply. As another example, AC charger adapters have a small quiescent current when plugged into an AC outlet, even when no load is plugged into the AC charger.

DETAILED DESCRIPTION

The present disclosure provides a quiescent power supply to reduce, and in some examples eliminate, current drawn from an AC power source during periods of inactivity. Said differently, the quiescent power supply can disconnect itself from the AC power source when either no load is connected to the quiescent power supply or when a load is in an idle state.

Accordingly, the present disclosure provides a quiescent power supply to disconnect from an AC power source to increase an efficiency of energy usage, reduce an amount of energy consumed, and/or reduce a cost to operate the electronic device to which the quiescent power supply is attached.

A quiescent power supply according to the present disclosure can be implemented as a standalone AC power adapter or in an electronic device. For example, an electronic device (e.g., television, monitor, stereo equipment, printer, refrigerator, computer power supply, battery charger power supply, or the like) can be implemented with a quiescent power supply according to the present disclosure. It is noted, that no attempt is made to provide an exhaustive list of all electronic devices that can be implemented with a quiescent power supply according to the present disclosure. As such, the claims are not to be limited in this context.

Figure 1:
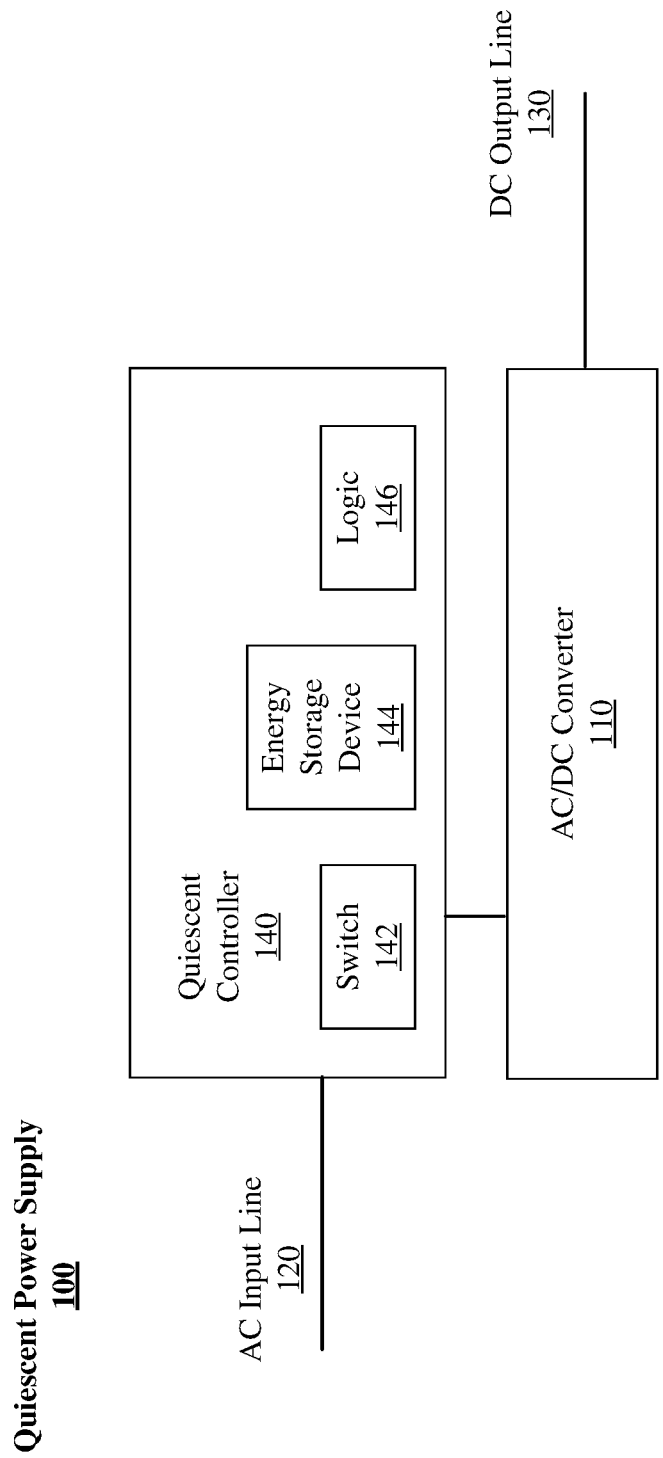
FIG. 1 illustrates a first example system.

FIG. 1 illustrates an example quiescent power supply 100. The quiescent power supply 100 includes an AC to DC converter 110 ("AC/DC converter"), an AC input line 120, and a DC output line 130. The quiescent power supply 100 also includes a quiescent controller 140 including a switch 142, an energy storage device 144, and logic 146. The switch 142 is electrically coupled between the input line 120 and the AC/DC converter 110.

The AC/DC converter 110 can be any converter to receive AC current from the AC input line 120 and output DC current on the DC output line 130. The AC/DC converter 110 can be a switched-mode power supply, a rectifier, a mains power supply unit, or the like.

During operation, the switch 142 can electrically disconnect the AC/DC converter 110 from the AC input line 120. Accordingly, the switch 142 can stop the flow of current from an AC power source (e.g., the power grid, an AC generator, or the like) into the AC/DC converter 110. As such, current drawn by the quiescent power supply 100 in an idle mode can be reduced and/or eliminated.

The switch 142 can be any of a variety of switching devices to electrically couple and/or decouple the AC/DC converter 110 from the AC input line 120. For example, the switch 142 can be a relay (e.g., a normally open relay, a normally closed relay, or the like), a semiconductor switch, a triode for alternating current (TRIAC), or the like.

In some examples, the energy storage device 144 is configured to provide power to the logic 146 and to actuate the switch 142. Additionally, in some examples, the energy storage device 144 can provide trigger current to a load operably coupled to the quiescent power supply 100. The energy storage device 144 can be any of a variety of device to store energy, such as, for example, a battery, a capacitor, a super capacitor, a fuel cell, or the like. In some examples, the energy storage device 144 can be a battery such as, for example, a rechargeable battery. The battery can be implemented with any of a variety of types of materials, such as, for example, lead-acid, nickel cadmium (NiCad), nickel metal hydride (NiMH), lithium ion (Li-ion), and lithium ion polymer (Li-ion polymer). Examples are not limited in this context. The energy storage device 144 can sized (e.g., physically, voltage capacity, current capacity, or the like) based on the application of the quiescent power supply.

The logic 146 is configured to control actuation of the switch 142. In particular, the logic 146 can actuate the switch 142 to electrically disconnect the AC/DC converter 110 from the AC input line 120. For example, the logic 146 can actuate the switch 142 to electrically disconnect the AC/DC converter 110 from the AC input line 120 when the quiescent power supply 100 is idle (e.g., refer to FIG. 6). The logic 146 can actuate the switch 142 to electrically connect the AC/DC converter 110 to the AC input line 120. For example, the logic 146 can actuate the switch 142 to electrically connect the AC/DC converter 110 to the AC input line 120 when the quiescent power supply 100 is operational (e.g., refer to FIG. 7).

Figure 2:
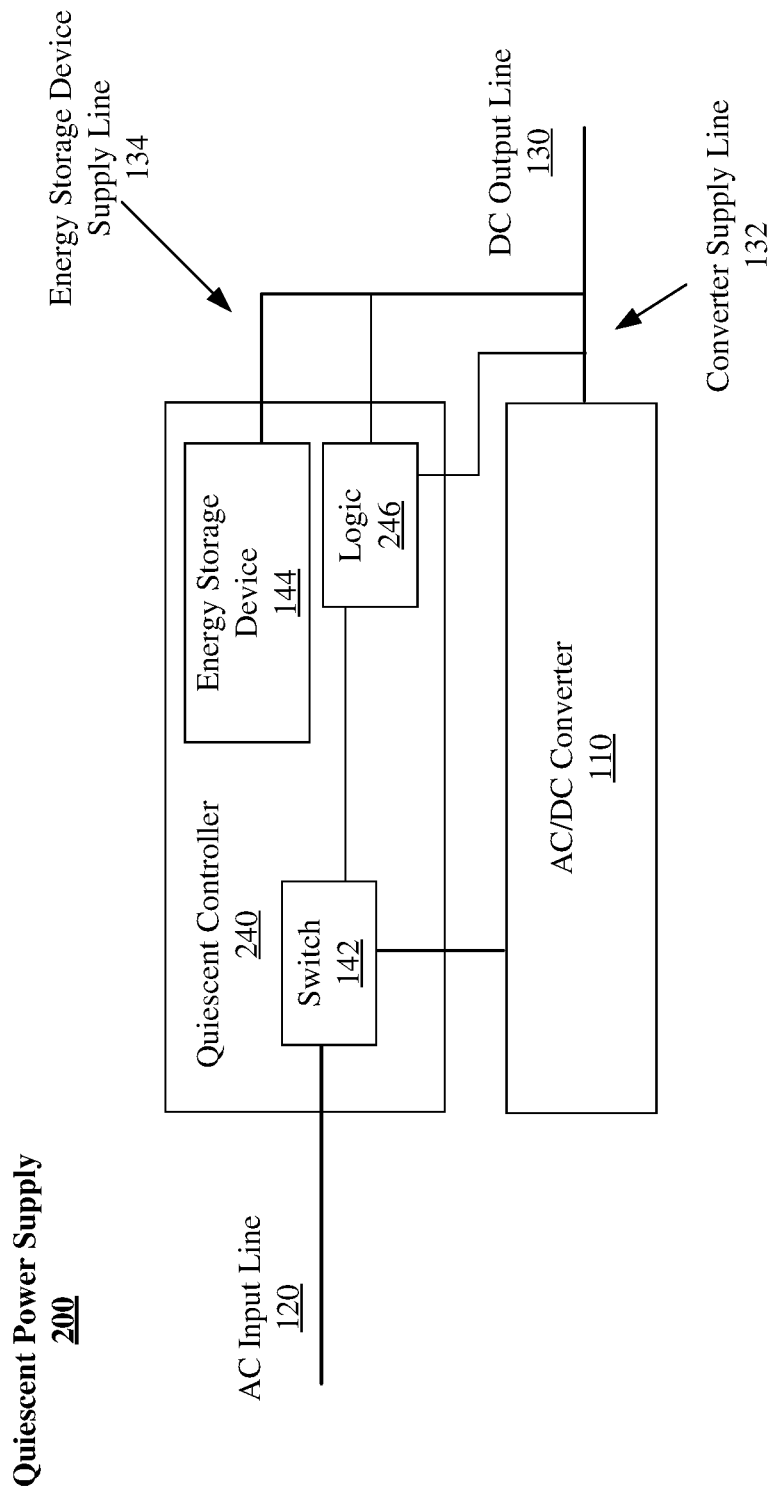
FIG. 2 illustrates a second example system.
Figure 3:
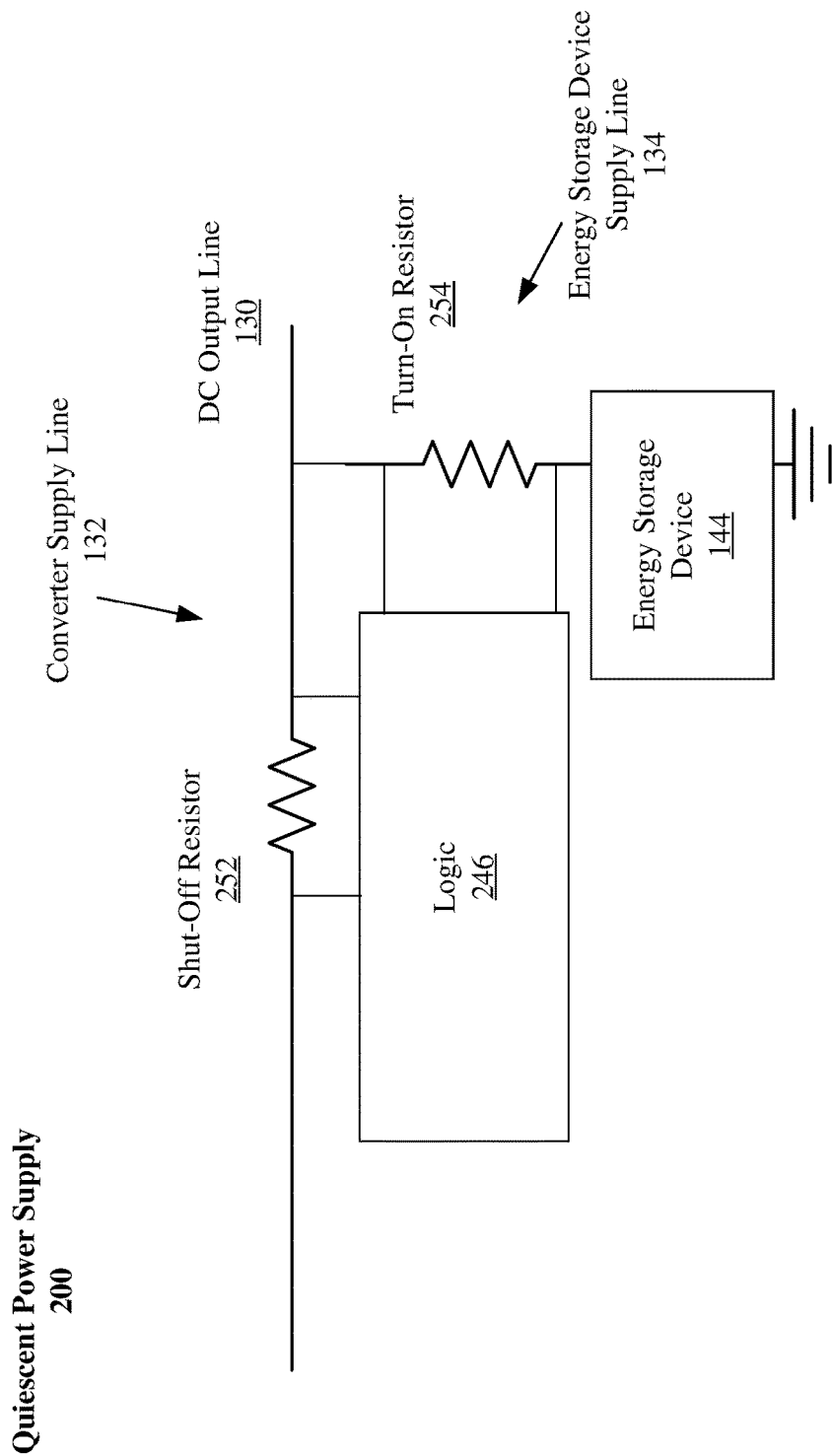
FIG. 3 illustrates a portion of the second example system of FIG. 2 in greater detail.

In some examples, the logic 146 can be configured to monitor the DC output line 130 to determine whether the quiescent power supply 100 is idle or is operational (e.g., refer to FIGS. 2-3). In some examples, the logic 146 can be triggered by an interrupt to determine whether the quiescent power supply 100 is idle or operational (e.g., refer to FIG. 4). For example, the logic 146 can receive a control signal (e.g., from a processing component, from a device operably coupled to the quiescent power supply 100, or the like), the control signal to include an indication that the current on DC output line 130 is below a threshold current and/or that the quiescent power supply 100 is idle.

FIG. 2 illustrates a block diagram of a quiescent power supply 200. The quiescent power supply 200 includes the AC/DC converter 110, the AC input line 120, and the DC output line 130. The quiescent power supply 200 also includes a quiescent controller 240 including the switch 142, the energy storage device 144, and logic 246. The switch 142 is electrically coupled between the input line 120 and the AC/DC converter 110. Additionally, the energy storage device 144 can be electrically coupled to the DC output line 130. In particular, the DC output line 130 includes a converter supply line 132 and an energy storage device supply line 134. The logic 246 is coupled to the DC output line 130 and the switch 142 and is operable to actuate the switch 142 to electrically couple and decouple the AC/DC converter 110 from the AC input line 120. In particular, the logic 246 is configured to determine whether the quiescent power supply 200 is idle based on the converter supply line 132 and the energy storage device supply line 134.

The logic 246 can determine that the quiescent power supply 200 is idle based on a determination that power consumption on the DC output line 130 has dropped below a threshold amount. Said differently, the logic 246 can determine whether the quiescent power supply 200 is idle based on a determination that power consumption of the target device, or the load on the quiescent power supply 200, has dropped below a threshold amount.

The logic 246 can actuate the switch 142 to electrically decouple the AC/DC converter 110 from the AC input line 120 based on a determination that power consumption on the DC output line 130 has dropped below a threshold value. Additionally, the logic 246 can actuate the switch 142 to electrically couple the AC/DC converter 110 to the AC input line 120 based on a determination that power consumption on the DC output line 130 has risen above a threshold value. In some examples, the threshold values at which the AC/DC converter 100 is decoupled and coupled from the AC input line 120 may be the same. In some examples, the threshold values at which the AC/DC converter 110 is decoupled and coupled from the AC input line 120 may be the different. In some examples, the threshold at which the AC/DC converter 110 is decoupled from the AC input line 120 may be lower than the threshold at which the AC/DC converter 110 is coupled to the AC input line 120.

It is noted, that the threshold value may be based on the load to which the quiescent power supply 200 is to be attached. However, to provide a clear disclosure only and not to be limiting, the threshold value may in some examples be between 0.1 milliamps and 250 milliamps.

Turning more particularly to FIG. 3, a portion of the quiescent power supply 200 is depicted in greater detail. In particular, the logic 246 and the connection between the logic 246 and the DC output line 130 is depicted in greater detail. As depicted, the quiescent power supply 200 can include a shut-off resistor 252 disposed in series between the AC/DC converter 110 (e.g., refer to FIG. 2) and the DC output line 130. Said differently, the converter supply line 132 can include the shut-off resistor 252. The quiescent power supply 200 can also include a turn-on resistor 254 disposed in series between the energy storage device 144 and the DC output line 130. Said differently, the energy storage device supply line 134 can include the turn-on resistor 254.

The logic 246 may be operably coupled to the shut-off resistor 252 and the turn-on resistor 254 to determine whether power consumption on the DC output line 130 has fallen below or risen above the threshold level(s). For example, the logic 246 can determine whether a voltage drop across the shut-off resistor 252 is below a threshold level to determine whether power consumption on the DC output line 130 has fallen below a threshold level. The logic 246 can determine whether a voltage drop across the turn-on resistor 254 is above a threshold level to determine whether power consumption on the DC output line 130 has risen above a threshold level.

In some examples, the logic 246 can include discrete and/or digital logic to actuate the switch 142 based on the voltage drops across the shut-off resistor 252 and turn-on resistor 254. In some examples, the logic 246 can include a microcontroller to monitor the voltage drops (e.g., across resistors 252/254), compare the voltage drops to a preset (or selectable) threshold, and actuate the switch 142 based on the comparison.

Figure 4:
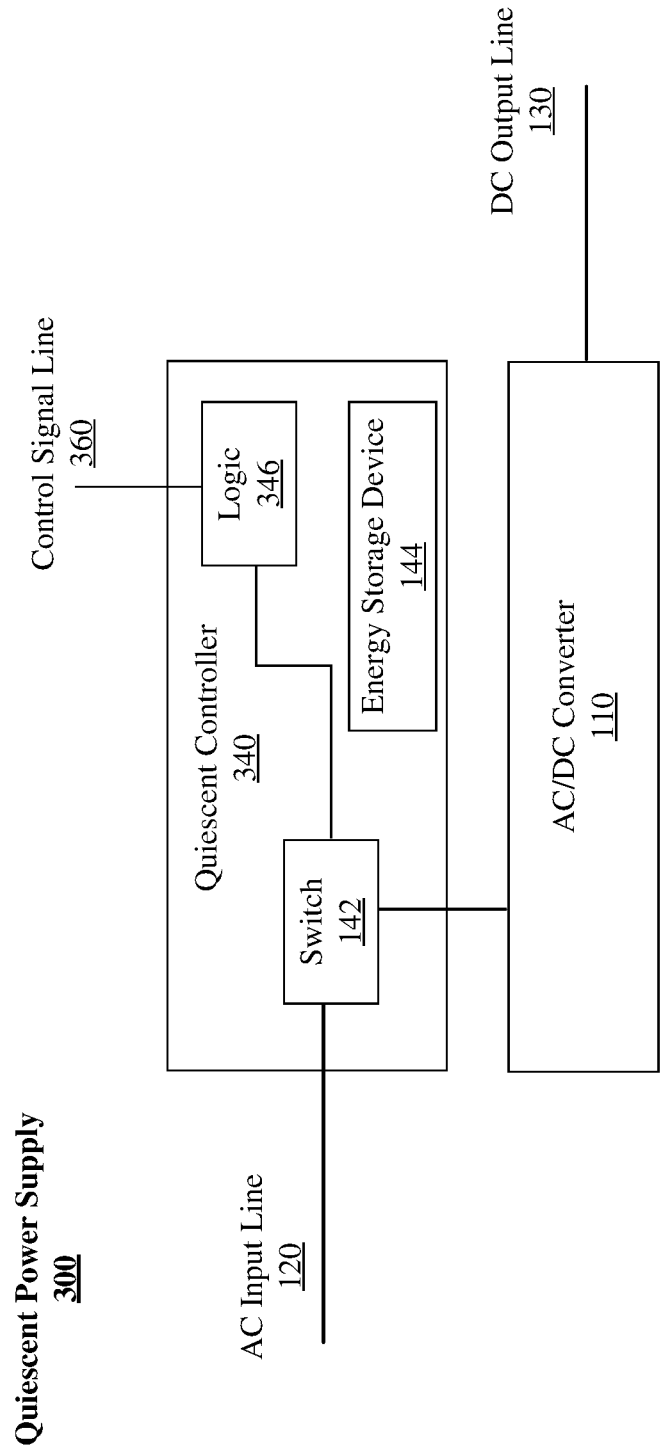
FIG. 4 illustrates a third example system.

FIG. 4 illustrates a block diagram of a quiescent power supply 300. The quiescent power supply 300 includes the AC/DC converter 110, the AC input line 120, and the DC output line 130. The quiescent power supply 300 also includes a quiescent controller 340 including the switch 142, the energy storage device 144, and logic 346. The switch 142 is electrically coupled between the input line 120 and the AC/DC converter 110. The logic 346 is coupled to the switch 142 and is operable to actuate the switch 142 to electrically couple and decouple the AC/DC converter 110 from the AC input line 120.

The logic 346 additionally includes a control signal line 360 (e.g., an interrupt pin, or the like) to receive a control signal to include an indication of whether the quiescent power supply 300 is idle or not. In particular, the logic 346 can receive a control signal to include an indication that a load (not shown) coupled to the quiescent power supply 300 is idle. The logic 346 can receive a control signal 346 from a processor and/or logic within the load, or device to which the quiescent power supply 300 is coupled. For example, the quiescent power supply 300 can be implemented in a television. The television (e.g., a media device operably coupled to the television, or a remote control, or the like) may provide a control signal to the quiescent power supply 300 (e.g., applied to the control signal line 360, or the like) during shutdown to include an indication that the quiescent power supply 300 is idle. The logic 346 may decouple the AC input line 120 from the AC/DC converter 110 to reduce and/or eliminate current drawn from the AC input line 120. During the idle period (e.g., while the AC/DC converter 110 is decoupled from the AC input line 120) the energy storage device 144 can provide trigger current to the television.

When the television is powered back on, the television may provide a control signal to the quiescent power supply 300 (e.g., applied to the control signal line 360, or the like) during power up to include an indication that the quiescent power supply 300 is not idle. The logic 346 may couple the AC input line 120 to the AC/DC converter 110 to provide sufficient operating current to be drawn from the AC input line 120 for operation of the television.

It is worthy to note, that the television example given above is provided for clarity of presentation only and not to be limiting. The quiescent power supplies described herein can be implemented in any of a variety of electronic devices. Additionally, the control signal can be provided over any of a variety of interfaces. For example, the logic could receive the control signal via a USB Type-C interface.

Figure 5:
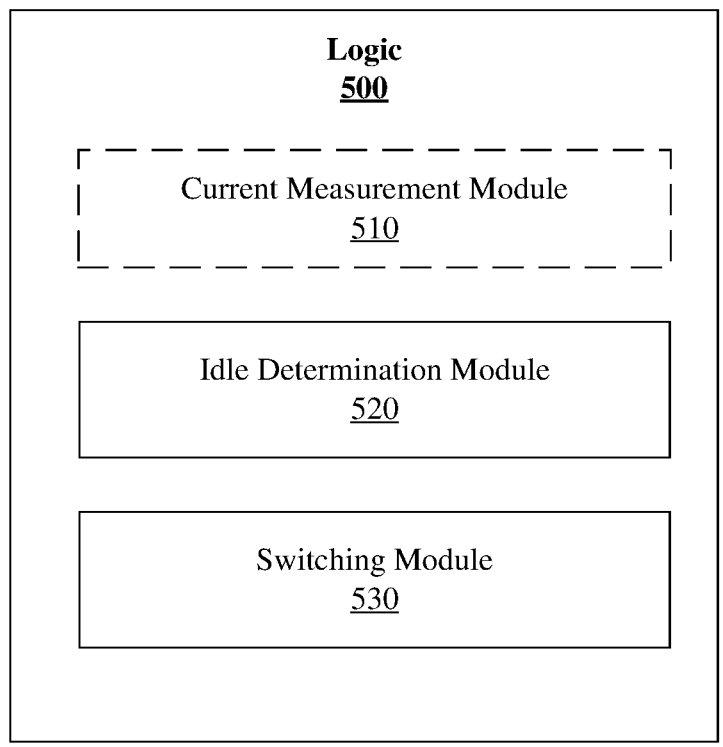
FIG. 5 illustrates an example logic.

FIG. 5 illustrates a block diagram of an example logic 500. The logic 500 can be implemented as the logic 146, the logic 246, and/or the logic 346 of the quiescent controllers 100, 200, and/or 300. The logic 500, at least a portion of which can be implemented in hardware, may include circuitry, discrete logic, digital logic, specially programmed processors, non-transient memory storing instructions to be executed by the specially programmed processors, or the like. The logic 500 includes a current measurement module 510, an idle determination module 520, and a switching module 530. It is noted, that the logic 500 may optionally include the current measurement module. For example, as described above, in some examples, the logic may receive a control signal (e.g., interrupt, or the like) including an indication that the quiescent power supply is idle. Accordingly, in such an example, the logic 500 may not necessarily include the current measurement module 510.

The current measurement module 510 can determine a current flowing through the DC output line 130. In particular, the current measurement module 510 can determine a current flowing through the converter supply line 132 and/or the energy storage device supply line 134. For example, the current measurement module 510 can determine a voltage drop across the shut-off resistor 252 to determine an amount of current flowing through the converter supply line 132. The current measurement module 510 can determine a voltage drop across the turn-on resistor 254 to determine an amount of current flowing through the energy storage device supply line 134.

It is worthy to note, the with some examples, the current measurement module 510 may optionally be implemented. More specifically, some examples (e.g., televisions, media players, or the like) can include circuitry to implement an idle and/or sleep control signal (e.g., main power button circuitry, or the like) to provide an indication that the device is idle.

The idle determination module 520 can determine whether the current (e.g., as measured by the current measurement module 510, or the like) is less or greater than a threshold current to determine whether the quiescent power supply is in an idle mode or in an active mode (e.g., not in idle).

The switching module 530 can actuate the switch 142 to electrically decouple the AC/DC converter 110 from the AC input line 120 during while the quiescent power supply is idle or the electrically couple the AC/DC converter 110 to the AC input line 120 while the quiescent power supply is active (e.g., not idle).

Figure 6:
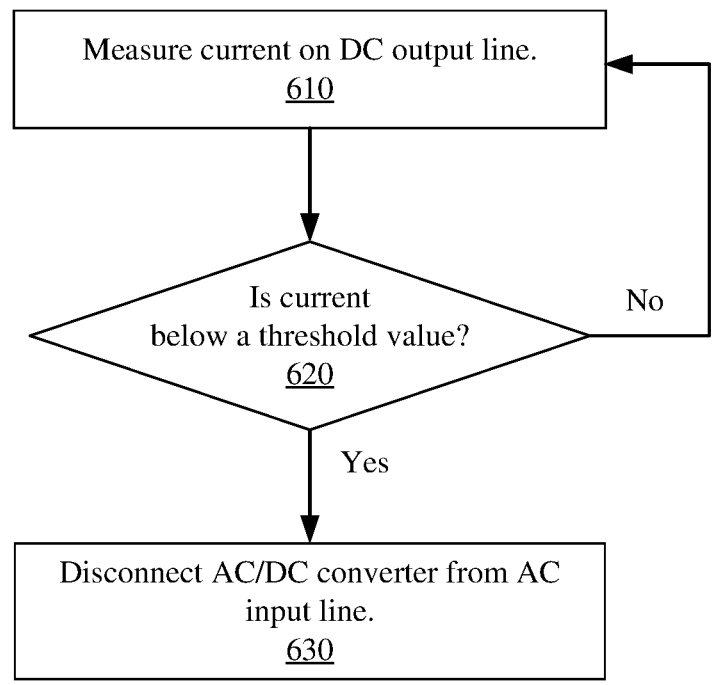
FIG. 6 illustrates a first example logic flow.

FIG. 6 illustrates an example logic flow 600. The logic flow 600 can be implemented by the quiescent power supply, or the quiescent controller (e.g., the quiescent controller 140, the quiescent controller 240, the quiescent controller 340, or the like) to decouple the AC/DC converter 110 from the AC input line 120. It is noted, the logic flow 600 is described with reference to the quiescent power supply 100 of FIG. 1. However, this is done for convenience and clarity only and not to be limiting.

The logic flow 600 may begin at block 610. At block 610 "measure current on the DC output line" the controller 140 can determine the current on the DC output line 130. Continuing to decision block 620 "is the current below a threshold value?" the controller 140 can determine whether the current on the DC output line 130 is below a threshold value. From decision block 620, the logic flow 600 can continue to block 630 or return to block 610. In particular, the logic flow 600 can continue from decision block 620 to block 610 based on a determination that the current on the DC output line 130 is not below the threshold value. Conversely, the logic flow 600 can continue from decision block 620 to block 630 based on a determination that the current on the DC output line 130 is below the threshold value.

At block 630 "disconnect the AC/DC converter from the AC input line," the controller 140 can actuate the switch 142 to disconnect the AC/DC converter 110 from the AC input line 120. Thus, the controller 140 can prevent current from being drawn from the AC supply line 120 during a period where the power supply is idle.

Figure 7:
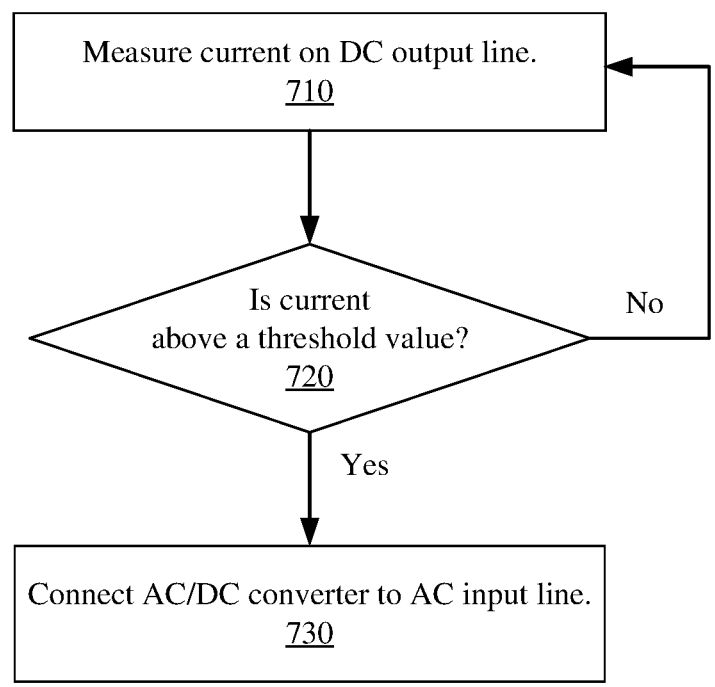
FIG. 7 illustrates a second example logic flow.

FIG. 7 illustrates an example logic flow 700. The logic flow 700 can be implemented by the quiescent power supply, or the quiescent controller (e.g., the quiescent controller 140, the quiescent controller 240, the quiescent controller 340, or the like) to couple the AC/DC converter 110 to the AC input line 120. It is noted, the logic flow 700 is described with reference to the quiescent power supply 100 of FIG. 1. However, this is done for convenience and clarity only and not to be limiting.

The logic flow 700 may begin at block 710. At block 710 "measure current on the DC output line" the controller 140 can determine the current on the DC output line 130. Continuing to decision block 720 "is the current above a threshold value?" the controller 140 can determine whether the current on the DC output line 130 is above a threshold value. From decision block 720, the logic flow 700 can continue to block 730 or return to block 710. In particular, the logic flow 700 can continue from decision block 720 to block 710 based on a determination that the current on the DC output line 130 is not above the threshold value. Conversely, the logic flow 700 can continue from decision block 720 to block 730 based on a determination that the current on the DC output line 130 is above the threshold value.

At block 730 "connect the AC/DC converter from the AC input line," the controller 140 can actuate the switch 142 to connect the AC/DC converter 110 from the AC input line 120.

Figure 8:
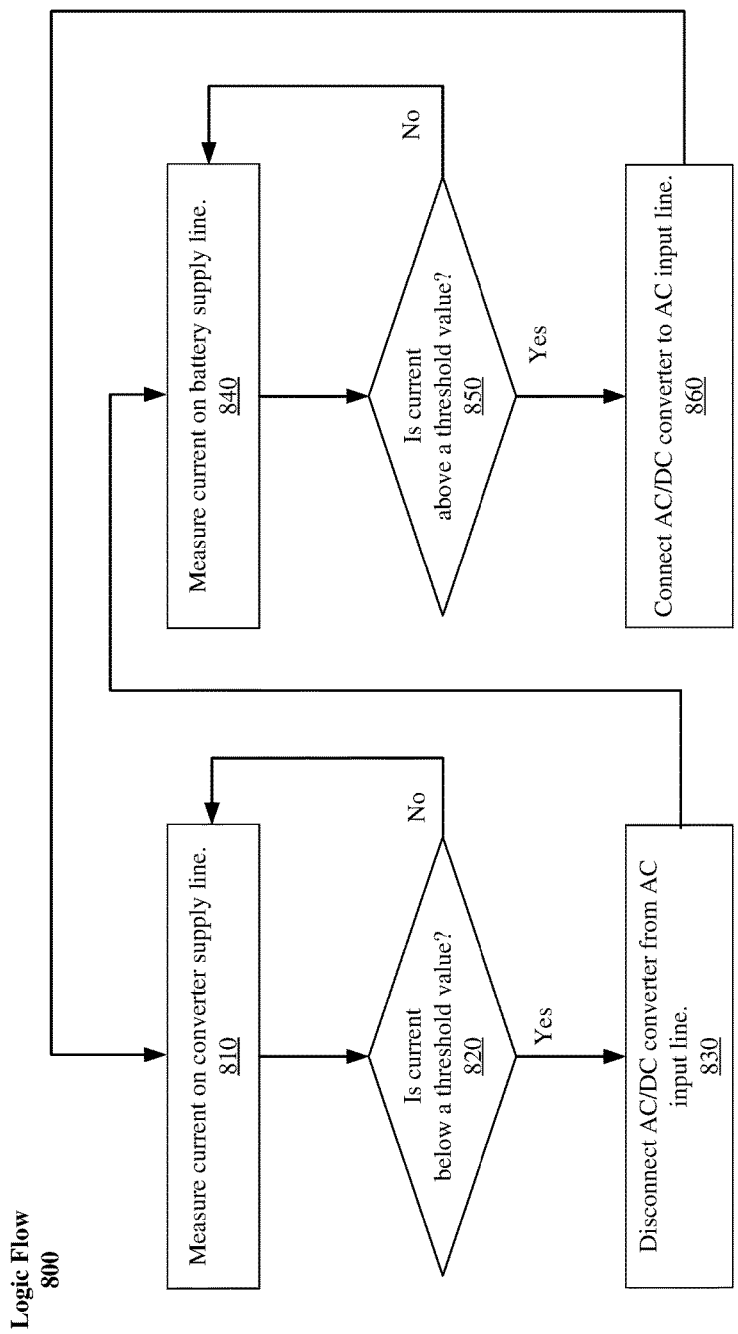
FIG. 8 illustrates a third example logic flow.

FIG. 8 illustrates an example logic flow 800. The logic flow 800 can be implemented by the quiescent power supply, or the quiescent controller (e.g., the quiescent controller 140, the quiescent controller 240, the quiescent controller 340, or the like) to decouple and/or couple the AC/DC converter 110 to the AC input line 120. It is noted, the logic flow 800 is described with reference to the quiescent power supply 200 of FIGS. 2-3. However, this is done for convenience and clarity only and not to be limiting.

The logic flow 800 may begin at block 810. At block 810 "measure current on the converter supply line" the logic 246 can determine the current on the converter supply line 132. Continuing to decision block 820 "is the current below a threshold value?" the logic 246 can determine whether the current on the converter supply line 132 is below a threshold value. From decision block 820, the logic flow 800 can continue to block 830 or return to block 810. In particular, the logic flow 800 can continue from decision block 820 to block 810 based on a determination that the current on the converter supply line 132 is not below the threshold value. Conversely, the logic flow 800 can continue from decision block 820 to block 830 based on a determination that the current on the converter supply line 132 is below the threshold value.

At block 830 "disconnect the AC/DC converter from the AC input line," the logic 246 can actuate the switch 142 to disconnect the AC/DC converter 110 from the AC input line 120. Thus, the logic 246 can prevent current from being drawn from the AC supply line 120 during a period where the power supply is idle.

Continuing to block 840 "measure current on an energy storage device supply line" the logic 246 can determine the current on the energy storage device supply line 134. Continuing to decision block 850 "is the current above a threshold value?" the logic 246 can determine whether the current on the energy storage device supply line 134 is above a threshold value. From decision block 850, the logic flow 800 can continue to block 860 or return to block 840. In particular, the logic flow 800 can continue from decision block 850 to block 840 based on a determination that the current on the DC output line 130 is not above the threshold value. Conversely, the logic flow 800 can continue from decision block 850 to block 860 based on a determination that the current on the energy storage device supply line 134 is above the threshold value.

At block 860 "connect the AC/DC converter from the AC input line," the logic 246 can actuate the switch 142 to connect the AC/DC converter 110 from the AC input line 120.

Figure 9:
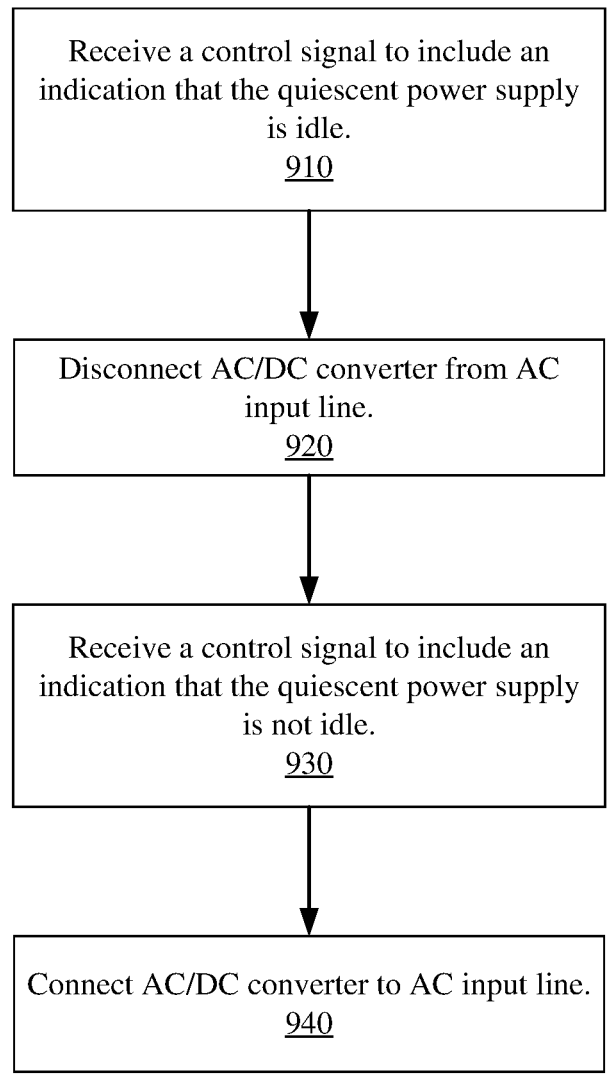
FIG. 9 illustrates an example of a storage medium.

FIG. 9 illustrates an example logic flow 900. The logic flow 900 can be implemented by the quiescent power supply, or the quiescent controller (e.g., the quiescent controller 140, the quiescent controller 240, the quiescent controller 340, or the like) to decouple and/or couple the AC/DC converter 110 to the AC input line 120. It is noted, the logic flow 900 is described with reference to the quiescent power supply 300 of FIG. 4. However, this is done for convenience and clarity only and not to be limiting.

The logic flow 900 may begin at block 910. At block 910 "receive a control signal to include an indication that the quiescent power supply is idle" the logic 346 can receive a control signal (e.g., interrupt, or the like) on control signal line 360, the control signal to include an indication that the quiescent power supply 300 is idle. Continuing to block 920 "disconnect the AC/DC converter from the AC input line," the logic 346 can actuate the switch 142 to disconnect the AC/DC converter 110 from the AC input line 120. Thus, the logic 346 can prevent current from being drawn from the AC supply line 120 during a period where the power supply is idle.

Continuing to block 930 "receive a control signal to include an indication that the quiescent power supply is not idle" the logic 346 can receive a control signal (e.g., interrupt, or the like) on control signal line 360, the control signal to include an indication that the quiescent power supply 300 is not idle. Continuing to block 940 "connect the AC/DC converter from the AC input line," the logic 346 can actuate the switch 142 to connect the AC/DC converter 110 from the AC input line 120.

Figure 10:
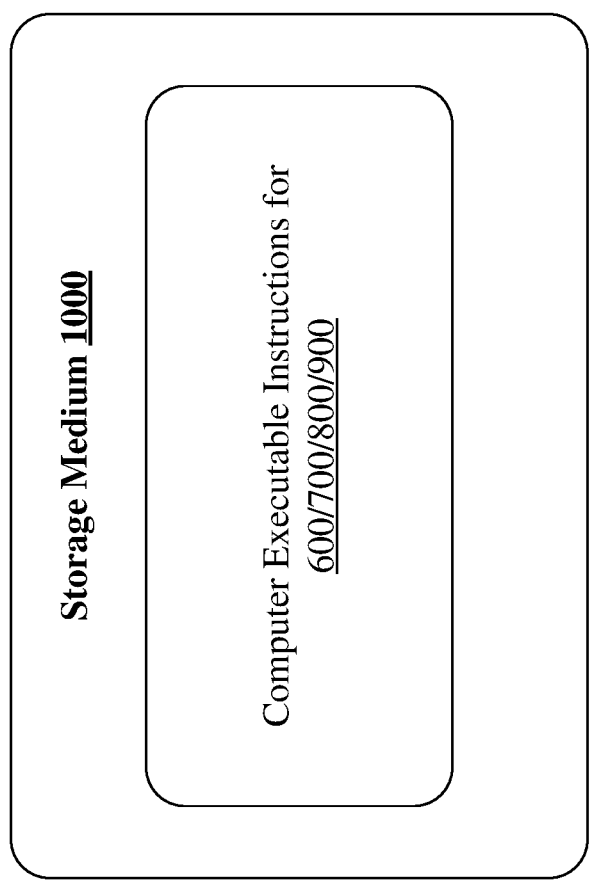
FIG. 10 illustrates an example device.

FIG. 10 illustrates an example storage medium 1000. As shown in FIG. 10, the storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 600, logic flow 700, logic flow 800, or logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
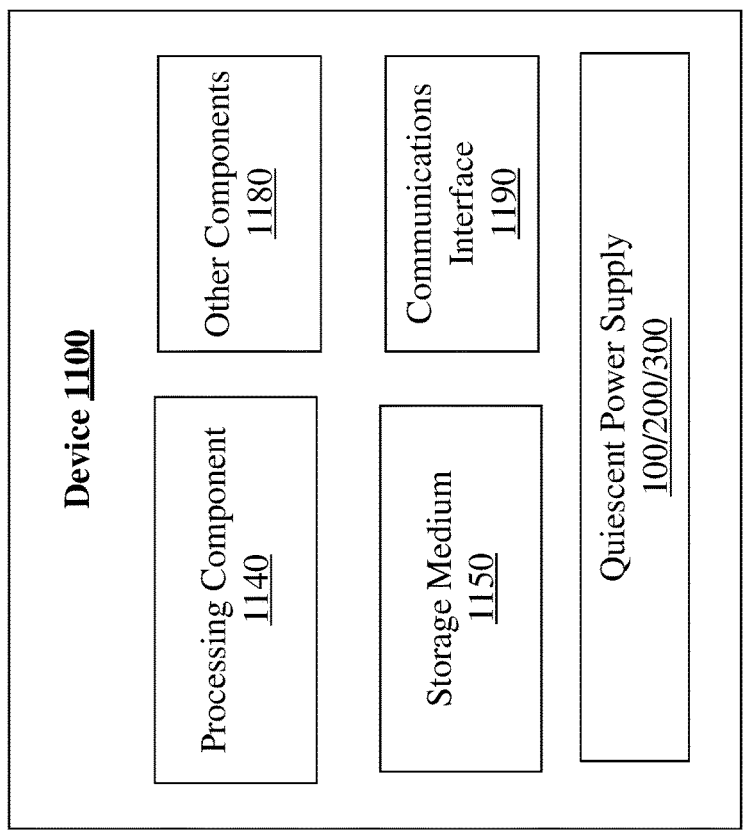
FIG. 11 illustrates an example device.

FIG. 11 illustrates an example device 1100. In some examples, as shown in FIG. 11, computing platform 1100 may include a processing component 1140, storage medium 1150, platform components 1180, a communications interface 1190 and a quiescent power supply (e.g., the quiescent power supply 100, the quiescent power supply 200, the quiescent power supply 300, or the like). Device 1100 may any of a variety of computing devices, such as, for example, a standalone power supply, a mobile device (e.g., smart phone, laptop, tablet, a wireless router, a docking station, a wireless charging station, or the like) a computing device (e.g., a display, desktop computer, a workstation computer, a server, or the like), an entertainment device (e.g., a television, a radio, a media player, powered speakers, or the like), an appliance (e.g., a range, a refrigerator, a washer, a dryer, a dishwasher, or the like), a tool (e.g., power tool, rechargeable tool, or the like).

Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1080 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth.

The storage medium 1050 can include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1090 may include logic and/or features to support a communication interface. For these examples, communications interface 1090 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

The components and features of computing platform 1100 may be implemented using any combination of discrete circuitry, application specific integrated circuits (ASICs), logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1

A quiescent power supply comprising: a converter to convert an alternating current (AC) from an AC input line to a direct current (DC) and to provide DC current on a DC output line; a switch disposed in series between the AC input line and the converter; an energy storage device to provide power to actuate the switch; and a controller operably coupled to the switch and the DC output line, the controller to actuate the switch to electrically disconnect the converter from the AC input line.

Example 2

The quiescent power supply of example 1, the controller to: determine whether power is needed on the DC output line; and actuate the switch to electrically disconnect the converter from the AC input line based on a determination that power is not needed on the DC output line.

Example 3

The quiescent power supply of example 1, the controller to: determine whether power is needed on the DC output line; and actuate the switch to electrically connect the converter to the AC input line based on a determination that power is needed on the DC output line.

Example 4

The quiescent power supply of example 1, the controller to: determine whether a current on the DC output line is less than a threshold value; and actuate the switch to electrically disconnect the converter from the AC input line based on a determination that the current on the DC output line is less than the threshold value.

Example 5

The quiescent power supply of example 3, the controller to actuate the switch to electrically connect the converter to the AC input line.

Example 6

The quiescent power supply of example 5, the controller to: determine whether a current on the DC output line is greater than the threshold value; and actuate the switch to electrically connect the converter to the AC input line based on a determination that the current on the DC output line is greater than the threshold value.

Example 7

The quiescent power supply of example 6, the DC output line comprising: a converter supply line to electrically couple the converter to the DC output line; and a energy storage device supply line to electrically couple to the energy storage device to the DC output line.

Example 8

The quiescent power supply of example 7, the converter supply line comprising a shut-off resistor disposed in series between the converter and the DC output line, the controller to: determine a voltage drop across the shut-off resistor; and determine whether a current on the DC output line is less than the threshold value based on the voltage drop across the shut-off resistor.

Example 9

The quiescent power supply of example 7, the energy storage device supply line comprising a turn-on resistor disposed in series between the energy storage device and the DC output line, the controller to: determine a voltage drop across the turn-on resistor; and determine whether a current on the DC output line is above the threshold value based on the voltage drop across the turn-on resistor.

Example 10

The quiescent power supply of example 1, the switch comprising a triode for AC (TRIAC), a normally open relay, or a normally closed relay.

Example 11

The quiescent power supply of example 1, the energy storage device comprising a rechargeable battery, a capacitor, a super capacitor, or a fuel cell.

Example 12

A system comprising: a platform component; and a quiescent power supply operably coupled to the platform component, the quiescent power supply comprising: a converter to convert an alternating current (AC) from an AC input line to a direct current (DC) and to provide DC current to the platform component via a DC output line; a switch disposed in series between the AC input line and the converter; an energy storage device to provide power to actuate the switch; and a controller operably coupled to the switch, the controller to actuate the switch to electrically disconnect the converter from the AC input line.

Example 13

The system of example 12, the controller to: determine whether current is needed on the DC output line; and actuate the switch to electrically disconnect the converter from the AC input line based on a determination that current is not needed on the DC output line.

Example 14

The system of example 12, the controller to: determine whether a current on the DC output line is less than a threshold value; and actuate the switch to electrically disconnect the converter from the AC input line based on a determination that the current on the DC output line is less than the threshold value.

Example 15

The system of example 14, the controller to actuate the switch to electrically connect the converter to the AC input line.

Example 16

The system of example 15, the controller to: determine whether a current on the DC output line is greater than the threshold value; and actuate the switch to electrically connect the converter to the AC input line based on a determination that the current on the DC output line is greater than the threshold value.

Example 17

The system of example 16, the DC output line comprising: a converter supply line to electrically couple the converter to the DC output line; and a energy storage supply line to electrically couple to the energy storage device to the DC output line.

Example 18

The system of example 17, the converter supply line comprising a shut-off resistor disposed in series between the converter and the DC output line, the controller to: determine a voltage drop across the shut-off resistor; and determine whether a current on the DC output line is less than the threshold value based on the voltage drop across the shut-off resistor.

Example 19

The system of example 17, the energy storage device supply line comprising a turn-on resistor disposed in series between the energy storage device and the DC output line, the controller to: determine a voltage drop across the turn-on resistor; and determine whether a current on the DC output line is above the threshold value based on the voltage drop across the turn-on resistor.

Example 20

The system of example 12, the switch comprising a triode for AC (TRIAC), a normally open relay, or a normally closed relay.

Example 21

The system of example 12, the energy storage device comprising a rechargeable battery, a capacitor, a super capacitor, or a fuel cell.

Example 22

The system of example 12, the platform component comprising one or more of a processing component, a graphics processing unit, a display, a speaker, or a light emitting diode.

Example 23

A method comprising: determining whether a current on a direct current (DC) output line of a converter is less than a threshold value, the converter to convert an alternating current (AC) from an AC input line to DC and to provide DC current on the DC output line; actuating a switch to electrically disconnect the converter from the AC input line based on a determination that the current on the DC output line is less than the threshold value, the switch disposed in series between the AC input line and the converter; and providing trigger current to the DC output line from an energy storage device during a period when the AC input line is electrically disconnected from the converter.

Example 24

The method of example 23, comprising: determining whether a current on the DC output line is greater than the threshold value; and actuating the switch to electrically connect the converter to the AC input line based on a determination that the current on the DC output line is greater than the threshold value.

Example 25

The method of example 24, comprising: determining a voltage drop across a shut-off resistor, the shut-off resistor disposed in series between the converter and the DC output line; and determining whether a current on the DC output line is less than the threshold value based on the voltage drop across the shut-off resistor.

Example 26

The method of example 24, comprising: determining a voltage drop across a turn-on resistor, the turn-on resistor disposed in series between the energy storage device and the DC output line; and determining whether a current on the DC output line is above the threshold value based on the voltage drop across the turn-on resistor.

Example 27

The method of example 23, the switch comprising a triode for AC (TRIAC), a normally open relay, or a normally closed relay.

Example 28

The method of example 23, the energy storage device comprising a rechargeable battery, a capacitor, a super capacitor, or a fuel cell.

Example 29

An apparatus comprising a converter, a switch, an energy storage device, and a controller to perform the method of any one of examples 23 to 28.

Example 30

At least one machine-readable storage medium comprising instructions that when executed by a controller, cause the controller to: determine whether a current on a direct current (DC) output line of a converter is less than a threshold value, the converter to convert an alternating current (AC) from an AC input line to DC and to provide DC current on the DC output line; actuate a switch to electrically disconnect the converter from the AC input line based on a determination that the current on the DC output line is less than the threshold value, the switch disposed in series between the AC input line and the converter; and provide trigger current to the DC output line from an energy storage device during a period when the AC input line is electrically disconnected from the converter.

Example 31

The at least one machine-readable storage medium of example 30, comprising instructions that cause the controller to: determine whether a current on the DC output line is greater than the threshold value; and actuate the switch to electrically connect the converter to the AC input line based on a determination that the current on the DC output line is greater than the threshold value.

Example 32

The at least one machine-readable storage medium of example 30, comprising instructions that cause the controller to: determining a voltage drop across a shut-off resistor, the shut-off resistor disposed in series between the converter and the DC output line; and determining whether a current on the DC output line is less than the threshold value based on the voltage drop across the shut-off resistor.

Example 33

The at least one machine-readable storage medium of example 30, comprising instructions that cause the controller to: determining a voltage drop across a turn-on resistor, the turn-on resistor disposed in series between the energy storage device and the DC output line; and determining whether a current on the DC output line is above the threshold value based on the voltage drop across the turn-on resistor.

Example 34

The at least one machine-readable storage medium of example 30, the switch comprising a triode for AC (TRIAC), a normally open relay, or a normally closed relay.

Example 35

The at least one machine-readable storage medium of example 30, the energy storage device comprising a rechargeable battery, a capacitor, a super capacitor, or a fuel cell.

What is claimed is:

1. A quiescent power supply comprising:
a converter to convert an alternating current (AC) from an AC input line to a direct current (DC) and to provide DC current on a DC output line, the converter and the DC output line electrically coupled via a converter supply line, the converter supply line comprising a shut-off resistor disposed in series between the converter and the DC output line;
a switch disposed in series between the AC input line and the converter;
an energy storage device to provide power to actuate the switch;
an energy storage device supply line to electrically couple the energy storage device to the DC output line, the energy storage device supply line comprising a turn-on resistor disposed in series between the energy storage device and the DC output line; and
a controller operably coupled to the switch and the DC output line, the controller to identify an idle state based on a voltage drop across the shut-off resistor and a voltage drop across the turn-on resistor, and actuate the switch to electrically disconnect the converter from the AC input line based on identification of the idle state.

2. The quiescent power supply of claim 1, the controller to:
determine whether a current on the DC output line is less than a threshold value based on the voltage drop across the shut-off resistor; and
actuate the switch to electrically disconnect the converter from the AC input line based on a determination that the current on the DC output line is less than the threshold value.

3. The quiescent power supply of claim 1, the controller to:
determine whether a current on the DC output line is greater than a threshold value based on the voltage drop across the turn-on resistor; and
actuate the switch to electrically connect the converter to the AC input line based on a determination that the current on the DC output line is greater than the threshold value.

4. The quiescent power supply of claim 1, the controller to:
determine whether a current on the DC output line is less than the threshold value based on the voltage drop across the shut-off resistor.

5. The quiescent power supply of claim 1 the controller to:
determine whether a current on the DC output line is above the threshold value based on the voltage drop across the turn-on resistor.

6. The quiescent power supply of claim 1, the switch comprising a triode for AC (TRIAC), a normally open relay, or a normally closed relay.

7. The quiescent power supply of claim 1, the energy storage device comprising a rechargeable battery, a capacitor, a super capacitor, or a fuel cell.

8. The quiescent power supply of claim 1, the controller to identify the idle state based on a control signal received from a platform component electrically coupled to the DC output line.

9. The quiescent power supply of claim 8, the controller comprising an interrupt pin to receive the control signal.

10. The quiescent power supply of claim 1, the energy storage device to provide power to a platform component electrically coupled to the DC output line when the converter is electrically disconnected from the AC input line.

11. The quiescent power supply of claim 10, the power provided to the platform component comprising a trigger current.

12. A system comprising:
a platform component; and
a quiescent power supply operably coupled to the platform component, the quiescent power supply comprising:
a converter to convert an alternating current (AC) from an AC input line to a direct current (DC) and to provide DC current to the platform component via a DC output line, the converter and the DC output line electrically coupled via a converter supply line, the converter supply line comprising a shut-off resistor disposed in series between the converter and the DC output line;

a switch disposed in series between the AC input line and the converter;

an energy storage device to provide power to actuate the switch;

an energy storage device supply line to electrically couple the energy storage device to the DC output line, the energy storage device supply line comprising a turn-on resistor disposed in series between the energy storage device and the DC output line; and a controller operably coupled to the switch and the DC output line, the controller to identify an idle state of the quiescent power supply based on a voltage drop across the shut-off resistor and a voltage drop across the turn-on resistor, and actuate the switch to electrically disconnect the converter from the AC input line based on identification of the idle state.

13. The system of claim 12, the controller to:

determine whether a current on the DC output line is less than a threshold value based on the voltage drop across the shut-off resistor; and actuate the switch to electrically disconnect the converter from the AC input line based on a determination that the current on the DC output line is less than the threshold value.

14. The system of claim 12, the controller to:

determine whether a current on the DC output line is greater than a threshold value; and actuate the switch to electrically connect the converter to the AC input line based on a determination that the current on the DC output line is greater than the threshold value.

15. The system of claim 12, the switch comprising a triode for AC (TRIAC), a normally open relay, or a normally closed relay.

16. The system of claim 12, the energy storage device comprising a battery, a rechargeable battery, a capacitor, a super capacitor, or a fuel cell.

17. The system of claim 12, the platform component comprising one or more of a processing component, a graphics processing unit, a display, a speaker, or a light emitting diode.

18. The system of claim 12, the controller to identify the idle state based on a control signal received from a platform component electrically coupled to the DC output line.

19. The system of claim 18, the controller comprising an interrupt pin to receive the control signal.

20. The system of claim 12, the energy storage device to provide power to the platform component when the converter is electrically disconnected from the AC input line.

21. The system of claim 20, the power provided to the platform component comprising a trigger current.

22. A method comprising:

determining a voltage drop across a turn-on resistor included in an energy storage device supply line electrically coupling an energy storage device and a direct current (DC) output line of a converter, the turn-on resistor disposed in series between the energy storage device and the DC output line;

determining whether a current on the DC output line of the converter is greater than a first threshold value based on the voltage drop across the turn-on resistor, the converter to convert an alternating current (AC) from an AC input line to DC and to provide DC current on the DC output line;

determining a voltage drop across a shut-off resistor, the shut-off resistor disposed in series between the converter and the DC output line;

determining whether the current on the DC output line is less than a second threshold value based on the voltage drop across the shut-off resistor; and actuating a switch with power from the energy storage device to electrically connect the converter to the AC input line based on a determination that the current on the DC output line is greater than the first threshold value and a determination that the current on the DC output line is less than the second threshold, the switch disposed in series between the AC input line and the converter.

23. The method of claim 22, comprising:

determining whether a current on the DC output line is less than the first threshold value; and actuating the switch to electrically disconnect the converter to the AC input line based on a determination that the current on the DC output line is less than the first threshold value.

24. The method of claim 23, comprising providing trigger current to the DC output line from the energy storage device during a period when the AC input line is electrically disconnected from the converter.

25. The method of claim 22, comprising powering a platform component electrically coupled to the DC output line with the energy storage device when the converter is electrically disconnected from the AC input line.

* * * * *

UNITED STATES PATENT AND TRADEMARK OFFICE
CERTIFICATE OF CORRECTION

PATENT NO. : 10,050,547 B2  
APPLICATION NO. : 15/086004  
DATED : August 14, 2018  
INVENTOR(S) : Jaakko Raittinen, Arto Siili and Jaakko Isohella It is certified that error appears in the above-identified patent and that said Letters Patent is hereby corrected as shown below:

In the Claims

Column 16, Line 33, Claim 4, replace "the threshold" with -- a threshold --.

Signed and Sealed this
Sixteenth Day of October, 2018

Andrei Iancu
*Director of the United States Patent and Trademark Office*